Aug. 7, 1956    G. A. LYON    2,757,979
WHEEL COVER
Filed June 20, 1955
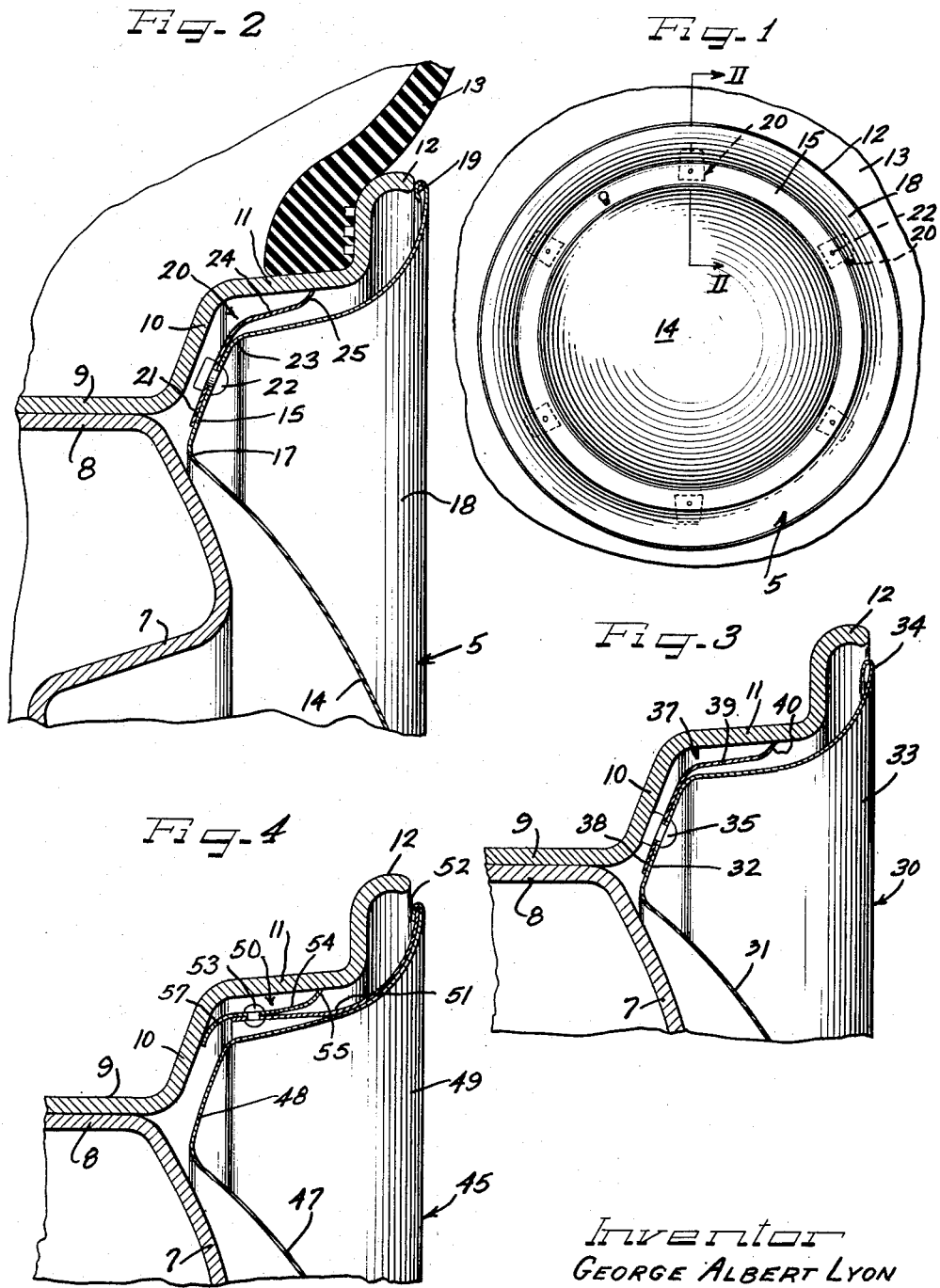
Inventor
GEORGE ALBERT LYON United States Patent Office 2,757,979
Patented Aug. 7, 1956

2,757,979

WHEEL COVER

George Albert Lyon, Detroit, Mich.

Application June 20, 1955, Serial No. 516,540

6 Claims. (Cl. 301—37)

The present invention relates to improvements in wheel structures and more particularly concerns the ornamental and protective covering of the outer sides of vehicle wheels.

An object of the invention is to provide an improved wheel structure having a wheel cover that is retained on the wheel by novel retaining means.

Another object of the invention is to provide an improved vehicle wheel cover having novel retaining finger means engageable in press-on, pry-off relation with a flange of a vehicle wheel.

A further object of the invention is to provide improved cover-retaining means for vehicle wheel covers.

Other objects, features and advantages of the present invention will be readily apparent from the following detailed description of certain preferred embodiments thereof taken in conjunction with the accompanying drawing wherein:

Figure 1 is an outer side elevational view of a wheel structure embodying features of the invention;

Figure 2 is an enlarged fragmentary radial sectional view taken substantially on the line II—II of Figure 1;

Figure 3 is a fragmentary radial sectional view similar to Figure 2 but showing a modification; and Figure 4 is a similar radial sectional view showing a further modification.

A vehicle wheel cover 5 (Figures 1 and 2) is adapted to be applied to the outer side of a vehicle wheel such as an automobile wheel having a disk spider wheel body 7 provided with an axially extending outer marginal attachment flange 8 secured in suitable fashion to a base flange 9 of a tire rim. From the outer side of the base flange 9 of the tire rim extends a generally axially outwardly facing and radially and axially outwardly sloping side flange 10 merging with a generally axially outwardly extending and radially outwardly sloping intermediate flange 11 which leads into a terminal flange that projects radially outwardly and then is turned generally axially outwardly as shown at 12. The flanges of the tire rim are constructed and arranged for supporting a pneumatic tire 13 which may be of the tubeless type or may be a tire and tube assembly.

The cover 5 is preferably in the form of a disk of suitable sheet material such as stainless steel, brass, aluminum, or the like which is suitable for drawing into shape and may be finished in satisfactory manner such as by polishing and plating. Although a full disk cover is shown, that is a cover that substantially entirely overlies the outer side of the wheel, it will be apparent that if desired the cover may comprise a circular ring-like trim member that extends over only a part of the wheel.

In the present instance the cover 5 includes a central crown portion which is preferably of a diameter to substantially cover the wheel body 7 to adjacent the juncture of the wheel body and the tire rim. There the sloping side wall of the crown portion 14 joins an inwardly dished annular intermediate portion 15 of the cover which in assembly is adapted to overlie the side flange 10 of the tire rim. Juncture of the crown portion and the intermediate portion 15 is at a small radius annular generally inwardly directed reinforcing rib 17. At the radially outer side of the intermediate cover portion 15 is an outer marginal annular cover portion 18 dimensioned to overlie concealingly the outer side of the tire rim and for this purpose being of generally axially and radially outwardly turned, large radius rib-like formation extending in radially inwardly spaced relation to the intermediate flange 11 of the tire rim and in overlying spaced relation to the terminal flange 12 of the tire rim to the tip of the latter flange. An underturned reinforcing and finishing bead extremity 19 on the cover portion 18 is adapted in assembly to lie upon the tip of the terminal flange 12 and to thereby support the entire cover in spaced relation otherwise to the tire rim and to the wheel body 7.

For retaining the cover 5 on the wheel, a series of retaining spring clips 20 is provided enabling press-on, pry-off attachment of the cover. To this end, each of the clips 20 comprises a base portion 21 which is secured against the back of the intermediate cover portion 15 as by means of a rivet 22 and extends to a limited extent beyond a juncture rib 23 of the intermediate and marginal portions of the cover into the space between the inner part of the marginal cover portion 18 and the intermediate flange 11 of the tire rim. From the outer annular portion of the base 21 of the retaining clip extends generally axially outwardly and radially outwardly obliquely a resilient clip leg 24 that has at its outermost extremity a short and stiff generally radially outwardly and slightly axially outwardly oblique terminal flange 25 which is engageable at its tip in retaining press-on, pry-off gripping relation with the tire rim intermediate flange 11.

By having the retaining clip leg 24 of substantial length and radially resiliently deflectable and disposed within the space between the intermediate flange 11 and the axially inner part of the cover portion 18 and spaced therefrom, ample radial deflectional range of movement is enabled for efficient operation of the clip leg. Moreover, by having the clip leg 24 spaced from but fairly closely adjacent to the intermediate flange 11, engagement of the clip with the intermediate flange 11 is such that while a strong gripping engagement is attained at the tip of the clip terminal 25, by reason of the radially inward deflection of the leg 24 under resilient tension incident to pressing the cover axially inwardly to deflect the tips 25 from an initially larger diameter than the inside diameter of the intermediate flange 11, pry-off can be effected efficiently. When a pry-off tool is applied behind the outer bead edge 19 of the retaining clip and pry-off leverage applied, there is, first, a tendency of the clip edges 25 to maintain their gripping more or less biting engagement with the intermediate flange 11. However, since there is no room between the cover and the tire rim for turning of the clip leg 24 upon itself, and by virtue of the generally axial outward extension thereof and thus arm-like thrust toward the retaining terminal 25, that is generally axial thrust toward the terminal, sufficient pry-off force applied to the cover will cause the retaining terminal 25 to eventually yield generally radially inwardly as enabled by radially inward flexure of the retaining leg 24 and thus slide at least incrementally axially outwardly along the intermediate flange. This is also enhanced by a tendency for the cover to move resiliently radially away from the retaining finger 20 adjacent to which the pry-off force is applied, as enabled by the resilient deflectability of the retaining finger or fingers at the opposite side of the cover. As will be seen in Figure 1, there may be six of the retaining fingers 20. However, there may be as many or as few of the retaining fingers as desired.

It will thus be apparent that the retaining fingers 20 afford an easy-on, hard-off type of retention for the cover.

By virtue of the heads of the rivets 22 being exposed at the outer side of the cover within the dished cover portion 15, visual indexing of the retaining clips is had so that pry-off force can be applied closely adjacent to one of the retaining fingers and then another of the retaining fingers in gradually prying the cover free from the wheel.

In the modification of Figure 3 a wheel cover 30 is shown which may be applied to the outer side of a vehicle wheel of substantially the same kind as shown in Figure 2. The wheel cover 30 is much the same as the wheel cover 5 in that it includes a central crown portion 31, an intermediate annular inwardly dished portion 32 of substantial width to lie opposite the side flange 10 of the tire rim, and an outer annular marginal portion 33 which is of a diameter to substantially overlie the tire rim. In this form, however, an underturned outer edge reinforcing and finishing bead 34 on the cover is adapted in assembly to lie in spaced relation to the tip of the terminal flange 12, and the inner portions of retaining rivets 35 for retaining spring clips 37 are adapted to bottom against the side flange 10 of the tire rim in assembly. The retaining clips 37 may be substantially like the retaining clips 20, having a base flange portion 38 secured by the rivets 35 to the back of the intermediate cover portion 32, and with generally axially outwardly and radially outwardly sloping oblique elongated retaining finger or leg portions 39 radially flexible in the space afforded thereby between the cover portion 33 and the intermediate flange 11 and engageable with the intermediate flange at outturned short and stiff retaining terminals 40.

When the cover 30 is applied to the outer side of the wheel, it is generally centered and then pressed axially inwardly and the retaining terminals 40 of the retaining clips will cam into retaining engagement with the intermediate flange 11 and resiliently flex the legs 39 of the clips into tensioned engagement toward the axially inner portion of the outer cover portion 33 until the rivets 35 bottom against the side flange 11. Removal of the cover from the wheel is effected by applying a pry-off force behind the outer edge thereof and applying pry-off force to effect disengagement of the retaining clips 37 similar as described in connection with the cover 5.

The modification shown in Figure 4 provides a cover 45 which may be in several respects much the same as the covers 5 and 30 and is adapted to be applied to the outer side of a wheel of substantially the same structure as shown in Figure 2 and therefor similar reference numerals on the wheel parts designate similar portions thereof. Similarly as in the other forms of the cover described, the cover 45 includes a central crown portion 47, an intermediate inwardly dished portion 48 that lies opposite the side flange 10 of the tire rim, and an outer annular marginal portion 49 which extends generally axially outwardly and radially outwardly and overlies the tire rim intermediate and terminal flanges 11 and 12. In the cover 45, however, a series of retaining spring clips 50 are provided which instead of being secured directly to the cover plate, are secured to a generally axially inwardly extending annular flange 51 which may, if desired, be separately formed from the cover plate and nested behind the axially outer portion of the annular marginal cover portion 49 and secured thereto as by means of an underturned outer marginal and reinforcing bead-like flange 52. At its axially inner margin the ring flange 51 diverges from the adjacent portion of the cover and lies in assembly in limited spaced relation to the intermediate flange 11 of the tire rim.

Each of the retaining spring fingers 50 is secured as by means of a rivet 53 to the inner marginal portion of the ring flange 51 and has an axially and radially outwardly directed divergently related resiliently flexible finger or leg 54 provided with a short and stiff retaining terminal 55 that is angled toward and engages in retaining gripping relation against the axially outer portion of the intermediate flange 11 of the tire rim. For maintaining the cover in cushioned axially outwardly spaced relation to not only the tire rim but also the wheel body, each of the retaining fingers 54 is preferably provided with a generally axially inwardly and radially inwardly turned resilient limit or bottoming flange 57 engageable against the side flange 10 of the tire rim for holding the cover in said spaced relation.

In applying the cover 45 to the outer side of a wheel, it is generally centered with respect to the wheel and then pressed axially inwardly so that the retaining finger terminals 55 will cam onto the axially outer portion of the intermediate flange 11 of the tire rim and enter into retaining gripping engagement therewith under the resilient tension of the clip legs 54. Axially inward movement of the cover is limited by engagement of the bottoming or tail portions 57 of the retaining fingers against the side flange. Removal of the cover 45 is effected by applying a pry-off tool therebehind for prying the same free similarly as described in connection with the covers 5 and 30.

In each of the forms of the cover disclosed herein, the retaining fingers are adapted to be made from thin high carbon spring steel stock which has a highly resilient characteristic and because of the hardness thereof affords retaining finger terminals that will substantially bite effectively into the tire rim flange without dulling as an incident to repeated applications and removals of the cover. Moreover, the hard spring steel characteristics of the retaining fingers highly resist setting deformations thereof due to strains imposed thereon, especially during pry-off, or as an incident to sharp bouncing of the wheel.

It will be understood that modifications and variations may be effected without departing from the scope of the novel concepts of the present invention.

I claim as my invention:

1. In a wheel structure including a wheel body supporting a tire rim having a side flange facing generally axially outwardly and an intermediate flange projecting generally axially and radially outwardly therefrom and facing radially inwardly, a cover for disposition at the outer side of the wheel including a central portion to overlie the wheel body and a radially outer portion to lie in substantially concentric limited radially inwardly spaced relation from said intermediate flange, with an intermediate deeply axially inwardly inset annular portion connected by respective annular angular juncture ribs to said central and radially outer portions and arranged to lie adjacent said rim side flange, the cover having secured thereon adjacent juncture of the radially outer and intermediate cover portions a series of circumferentially spaced resilient retaining fingers extending generally radially outwardly and having generally axially outwardly extending retaining finger legs of substantial length longer than the spacing between said radially outer cover portion and said intermediate flange and spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said radially outer cover portion and said retaining fingers being disposed in assembly in adjacent confronting relation to the side flange of the tire rim, the length of said finger legs and the narrow spacing between the intermediate flange and said radially outer cover portion precluding turning of the finger legs upon themselves during pry-off of the cover and compelling generally axially outward thrust of the legs toward said retaining terminals whereby to cause the terminals to yield and slide axially outwardly on said intermediate flange.

2. In a wheel structure as defined in claim 1, said retaining fingers having base portions angularly joining said finger legs and secured to the back of said intermediate cover portion.

3. In a wheel structure as defined in claim 2, said radially outer cover portion having a generally radially outwardly directed axially outer terminal engageable against the outer extremity of the tire rim and thereby defining the axially inward disposition of the cover on the wheel.

4. In a wheel structure as defined in claim 1, said radially outer cover portion having attached therebehind and extending axially inwardly into the space between the radially outer cover portion and said intermediate rim flange an annular flange to which said retaining fingers are secured adjacent said juncture of the intermediate and radially outer cover portions and said flange being spaced radially inwardly from the tire rim intermediate flange to accommodate the finger legs.

5. In a wheel structure as defined in claim 4, said retaining clips having turned tail portions which are engageable with the side flange of the tire rim for determining the axially inward disposition of the cover on the wheel.

6. In a wheel structure as defined in claim 1, said retaining fingers being secured to the intermediate cover portion by means of rivets having portions thereof for bottoming against the side flange to determine the axially inward disposition of the cover on the wheel.

References Cited in the file of this patent

UNITED STATES PATENTS

| | | |
|---|---|---|
| 2,135,757 | Lyon | Nov. 8, 1938 |
| 2,522,024 | Englehart | Sept. 12, 1950 |
| 2,683,630 | Lyon | July 13, 1954 |

FOREIGN PATENTS

| | | |
|---|---|---|
| 449,040 | Great Britain | June 19, 1936 |
| 374,096 | Italy | Aug. 14, 1939 |
| 487,724 | Canada | Nov. 4, 1952 |